United States Patent
Baek

(10) Patent No.: US 11,006,565 B2
(45) Date of Patent: May 18, 2021

(54) SMART SEEDER

(71) Applicant: Ju Hyuk Baek, Jeollabuk-do (KR)

(72) Inventor: Ju Hyuk Baek, Jeollabuk-do (KR)

( * ) Notice: Subject to any disclaimer, the term of this patent is extended or adjusted under 35 U.S.C. 154(b) by 471 days.

(21) Appl. No.: 15/736,919

(22) PCT Filed: May 26, 2016

(86) PCT No.: PCT/KR2016/005557
§ 371 (c)(1),
(2) Date: Nov. 13, 2018

(87) PCT Pub. No.: WO2016/204422
PCT Pub. Date: Dec. 22, 2016

(65) Prior Publication Data
US 2019/0069472 A1  Mar. 7, 2019

(30) Foreign Application Priority Data

Jun. 16, 2015  (KR) .......................... 10-2015-0085055

(51) Int. Cl.
| | |
|---|---|
| *A01C 7/04* | (2006.01) |
| *A01G 9/08* | (2006.01) |
| *A01C 7/12* | (2006.01) |
| *A01C 7/20* | (2006.01) |

(52) U.S. Cl.
CPC .................. *A01C 7/04* (2013.01); *A01C 7/12* (2013.01); *A01C 7/20* (2013.01); *A01G 9/085* (2013.01)

(58) Field of Classification Search
CPC .... A01C 7/04; A01C 7/00; A01C 7/12; A01C 7/08; A01C 7/20; A01G 9/085; A01G 9/08; A01G 9/00
See application file for complete search history.

(56) References Cited

U.S. PATENT DOCUMENTS 5,293,179 A * 3/1994 Ichikawa ............. B23K 37/047
347/56

FOREIGN PATENT DOCUMENTS

| JP | 05-013114 U | 2/1993 |
|---|---|---|
| JP | 07-203711 A | 8/1995 |
| KR | 20-1995-0026159 U | 10/1995 |
| KR | 2016/005557 U | 10/1995 |
| KR | 20-1998-0068935 U | 12/1998 |
| KR | 20-2010-0010801 U | 11/2010 |

OTHER PUBLICATIONS

International Search Report for corresponding PCT Application No. PCT/KR2016/005557 dated Aug. 8, 2016.

* cited by examiner

*Primary Examiner* — Christopher J. Novosad

(74) *Attorney, Agent, or Firm* — Wood, Phillips, Katz, Clark & Mortimer

(57) ABSTRACT

A smart seeder which significantly enhances efficiency in individual seed separation by enabling the seeds supplied onto a transfer plate to be spread more easily so that the seeds do not overlap, and consequently by enabling the seeds to be separated individually. Furthermore, the smart seeder can not only significantly reduce production costs due to the simple structure thereof, but also significantly enhance seed separation efficiency by separating one or multiple seeds, which may comprise fine seeds, such as lettuce seeds, or the like, whether the seeds are small seeds or large seeds.

14 Claims, 19 Drawing Sheets

SMART SEEDER

TECHNICAL FIELD

The present invention relates to a smart seeder which may more easily spread seeds supplied to a transfer plate such that the seeds does not overlap each other, may individually sort seeds one by one, thereby greatly improving individual sorting efficiency of the seeds, has a simple structure so that manufacturing costs thereof may be greatly reduced, and may sort one seed or a plurality of seeds including fine seeds such as lettuce seeds regardless of the sizes of the seeds, thereby greatly improving seed sorting efficiency.

BACKGROUND ART

In general, a first stage for cultivating horticultural crops such as prior crops, vegetables, special crops, and floricultural crops corresponds to sowing. Seeds may be directly sown in a bare ground according to kinds of crops. However, in this case, a germination rate deteriorates significantly, crops may be easily damaged due to weather conditions and pests in the early stages of growth, and it is difficult to meet a proper time of cultivation when the crops may be normally grown. In most farms, a method is used in which a worker sows and germinates seeds in a seed growing space of a seed pot one by one, cultivates the seeds for a predetermined period of time, and then transplants a seedling in an arable land such as the bare ground, a house, a hydroponic plantation and a tunnel, and the seeding may be managed in a small area with a small amount of labor force during a seeding growing period.

However, a very large amount of time is consumed to sow the seeds in the seed growing space of the seed pot one by one. Further, because the small seeds should be sown one by one by hands, work efficiency deteriorates.

To solve the above-described problems, recently, a seeding machine which may more easily and conveniently sow seeds in a seed growing space of a seed pot in a shorter time, and accordingly, may more greatly improve work efficiency of a worker is disclosed in Korean Patent No. 10-1038632.

However, in the case of Korean Patent No. 10-1038632, because seeds accommodated in a seed box are vertically stacked while overlapping each other, it is difficult for a seed collecting rod to individually sort the seeds in the seed box one by one, and thus individual sorting efficiency of the seeds is not good.

Further, currently, a seed vacuum-suction scheme and a flat-plate hole germination scheme are mainly used. However, when one seed or a plurality of seeds are selectively accommodated according to kinds of seeds and sown in the pot, accuracy of sowing the selectively accommodated seeds by a desired number is not good.

DISCLOSURE

Technical Problem

The present invention has been conceived to solve the above-described problems, and an aspect of the present invention is to provide a smart seeder which may more easily spread seeds supplied to a transfer plate such that the seeds does not overlap each other, may individually sort seeds one by one, thereby greatly improving individual sorting efficiency of the seeds, has a simple structure so that manufacturing costs thereof may be greatly reduced, and may sort one seed or a plurality of seeds including fine seeds such as lettuce seeds regardless of the sizes of the seeds, thereby greatly improving seed sorting efficiency.

Technical Solution

In order to achieve the above aspect, the present invention may provide a smart seeder including a transfer plate having a seed sorting groove formed at one end thereof, a portion or the entirety of one kind of seeds being inserted into the seed sorting groove, and seeds being supplied onto an upper surface of the transfer plate, a vibration generating unit configured to generate vibrations on the transfer plate, to spread the supplied seeds such that the seeds do not overlap each other, and at the same time, to move the seeds toward one end thereof, a rotating drum arranged to be adjacent to one end of the transfer plate to be rotated, and having a seed inserting groove formed on an outer peripheral surface thereof, the seeds inserted into the seed sorting groove of the transfer plate being moved and inserted into the seed inserting groove according to rotation, and a guide unit configured to guide, to a cell of a tray pot, the seeds which are inserted into the seed inserting groove of the rotating drum according to the rotation of the rotating drum and freely fall.

Here, it is preferable that the seed sorting groove of the transfer plate is provided in plurality, and the plurality of seed sorting grooves are formed at one end of the transfer plate at regular intervals.

Further, it is preferable that the seed inserting groove of the rotating drum is provided in plurality, and the plurality of seed inserting grooves are formed on an outer peripheral surface of the rotating drum at regular intervals.

Further, it is preferable that the seeds are inserted into the seed sorting groove of the transfer plate in a standing state.

Further, it is preferable that a seed accommodating groove is formed at one end of the transfer plate, and the seed sorting groove is formed at one end of a bottom surface of the seed accommodating groove.

Alternatively, it is preferable that guide walls are formed at one end of the transfer plate at regular intervals, a seed accommodating groove is formed at one end of the transfer plate between the guide walls, and the seed sorting groove is formed at one end of a bottom surface of the seed accommodating groove.

Further, it is preferable that an inclined surface downward inclined as it goes from an inner peripheral surface of the seed accommodating groove toward the seed sorting groove is formed on the bottom surface of the seed accommodating groove between an inner peripheral surface of the seed accommodating groove and the seed sorting groove.

Alternatively, it is preferable that guide walls are formed at one end of the transfer plate at regular intervals, and the seed sorting groove is formed at one end of the transfer plate between the guide walls.

Further, it is preferable that an inclined surface downward inclined as it goes from the guide wall toward the seed sorting groove is formed on an upper surface of the transfer plate between the guide walls.

In addition, it is preferable that a guide unit includes a guide body comprising an upper guide body provided below one side of the rotating drum and having a plurality of guide plates vertically formed therein at regular intervals, and a lower guide body provided below the upper guide body and having a plurality of through holes formed therein at regular intervals, and a guide tube comprising an upper guide tube located between the guide plates of the upper guide body, an upper portion of the upper guide tube being connected to a lower portion of the upper guide body such that the upper guide tube communicates with the upper guide body, and a lower portion of the upper guide tube being connected to an upper portion of a corresponding one of the plurality of through holes of the lower guide body such that the upper guide tube communicates with the corresponding one of the plurality of through holes of the lower guide body, and comprising a lower guide tube formed at a lower portion of the corresponding one of the plurality of through holes of the lower guide body such that the lower guide tube communicates with the corresponding one of the plurality of through holes of the lower guide body, and configured to guide, to the cell of the tray pot, the seeds sequentially passing through the upper guide body, the upper guide tube, and the plurality of through holes of the lower guide body.

Here, it is preferable that the lower guide body is provided in plurality, separation distances between the plurality of through holes differ from each other in accordance with the plurality of lower guide bodies, and any one of the plurality of lower guide bodies is detachably connected to a lower portion of the upper guide tube formed of a flexible material.

In addition, it is preferable that a transfer conveyor configured to transfer the tray pot seated on an upper surface of the transfer conveyor from one side to the other side of the transfer conveyor is provided below the guide unit.

Further, it is preferable that a detection unit configured to detect a pot of the tray pot that the transfer conveyor transfers, and a controller configured to control the transfer conveyor such that the transfer conveyor continuously or intermittently transfers the tray pot based on a detection signal of the detection unit are provided.

Further, it is preferable that a plurality of plates are detachably provided at one end of the transfer plate, the seed sorting groove is formed at one end of each of the plurality of plates, and the sizes of the seed sorting grooves differ from each other in accordance with the plurality of plates.

Further, it is preferable that a plurality of plates are detachably provided on an outer peripheral surface of the rotating drum, the seed inserting groove is formed on an outer peripheral surface of each of the plurality of plates, and the sizes of the seed inserting grooves differ from each other in accordance with the plurality of plates.

Advantageous Effects

According to the present invention, seeds supplied to a transfer plate may be more easily spread so as not to overlap each other through vibrations generated, by a vibration generating unit, on the transfer plate by which the seeds are supplied. Accordingly, the seeds moving toward one end of the transfer plate may be individually sorted one by one through a rotating drum formed on an outer peripheral surface of a seed inserting groove into which the seeds are inserted, so that individual sorting efficiency of the seeds may be greatly improved. In addition, a structure is simple so that manufacturing costs may be greatly reduced. Furthermore, one seed of a plurality of seeds including fine seeds such as lettuce seeds may be sorted regardless of the sizes of the seeds, so that seed sorting efficiency may be greatly improved.

MODES OF THE INVENTION

Hereinafter, exemplary embodiments of the present invention will be described in detail with reference to the accompanying drawings. Of course, the scope of the present invention is not limited to the exemplary embodiments disclosed below, and the present invention may be variously modified by those skilled in the art without departing from the technical spirit of the present invention.

Figure 1:
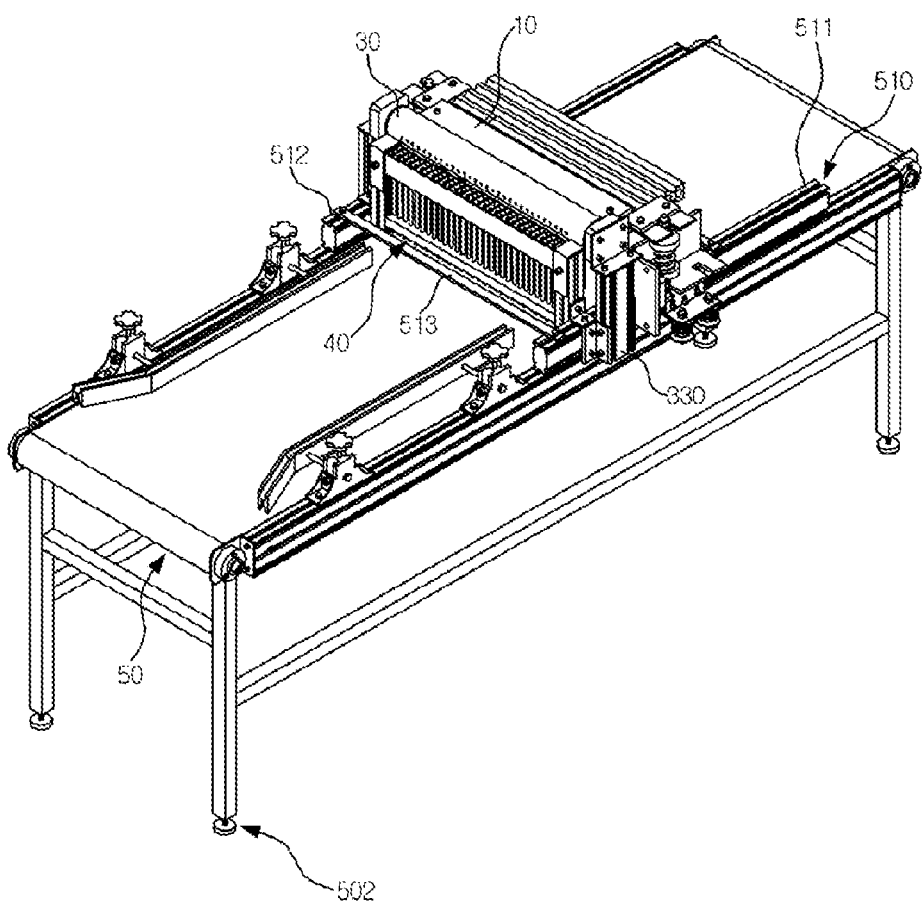
FIGS. 1 and 2 are perspective views schematically illustrating a smart seeder according to an embodiment of the present invention.
Figure 2:
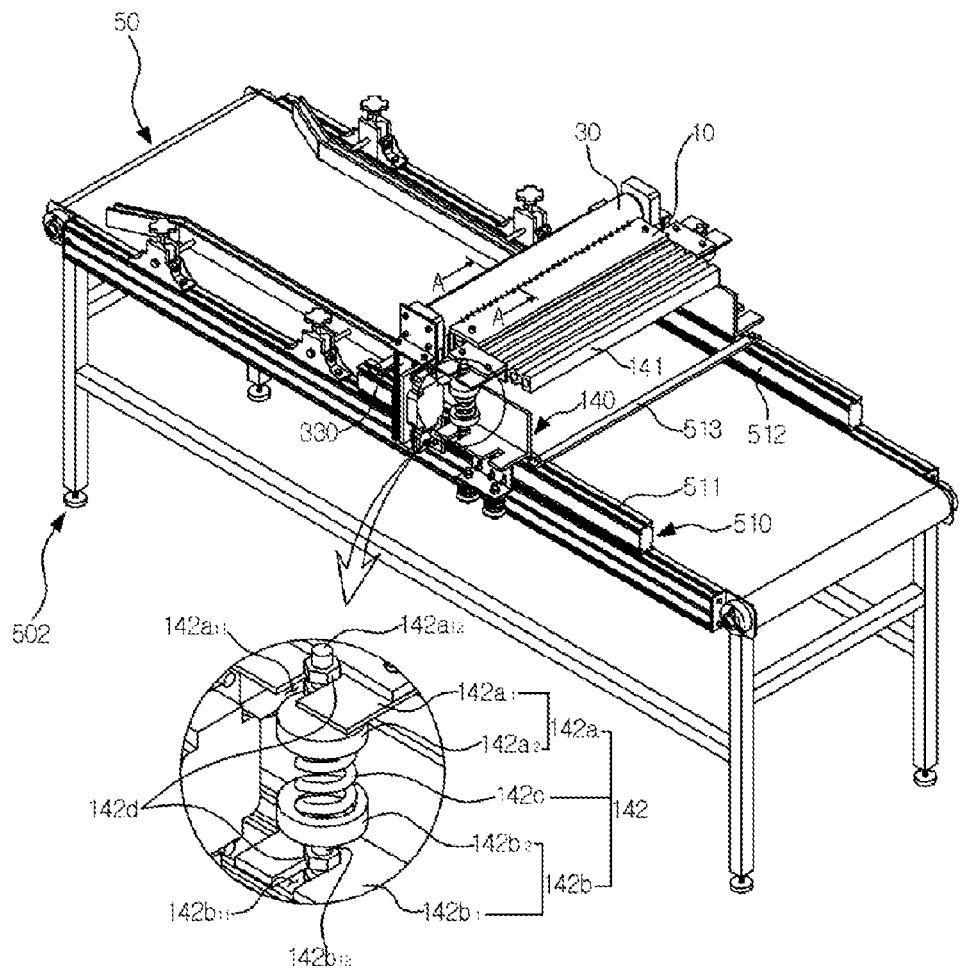
Figure 3:
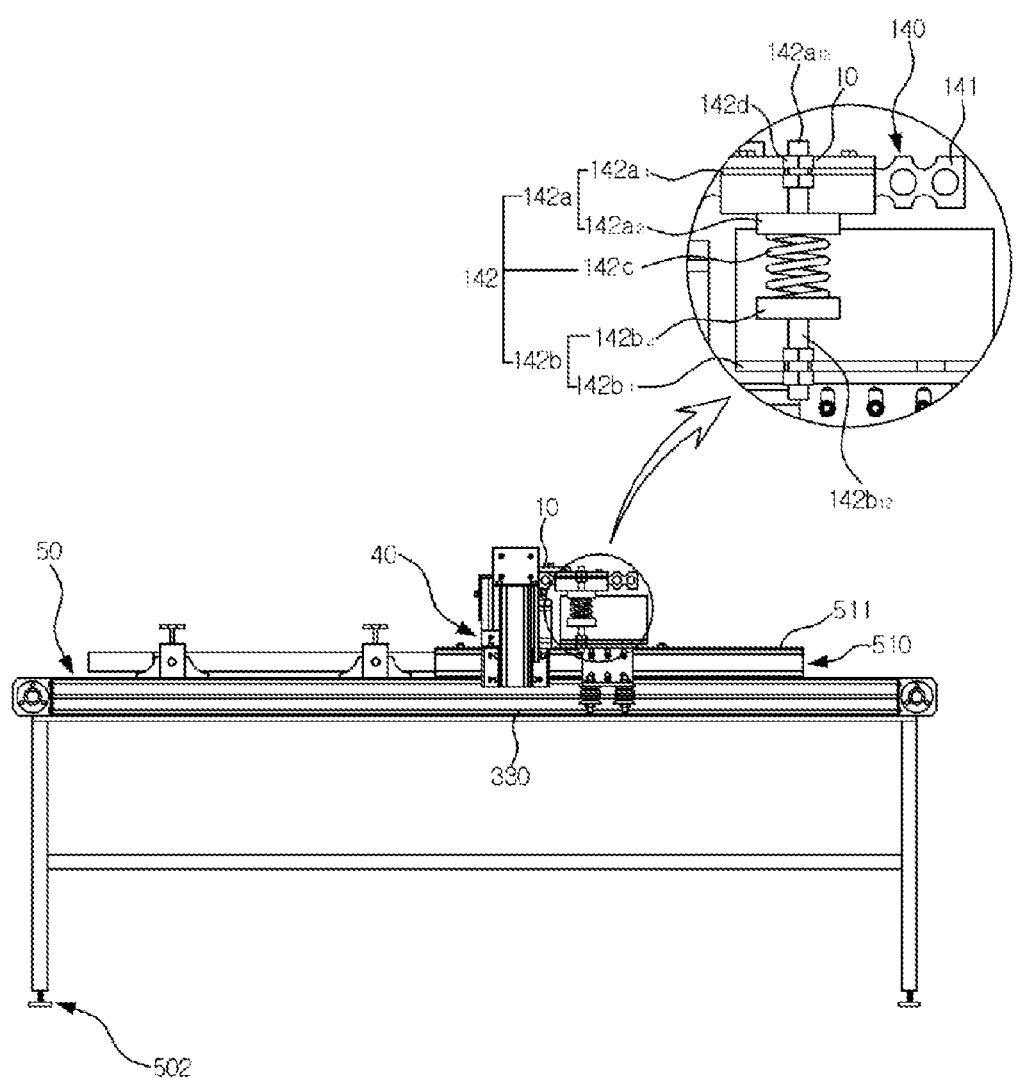
FIG. 3 is a front view of FIGS. 1 and 2.

FIGS. 1 and 2 are perspective views schematically illustrating a smart seeder according to an embodiment of the present invention, and FIG. 3 is a front view of FIGS. 1 and 2.

As illustrated in FIGS. 1 to 3, the smart seeder according to the embodiment of the present invention roughly includes a transfer plate 10, a vibration generating unit 20 (see FIG. 22), a rotating drum 30, and a guide unit 40.

Figure 4:
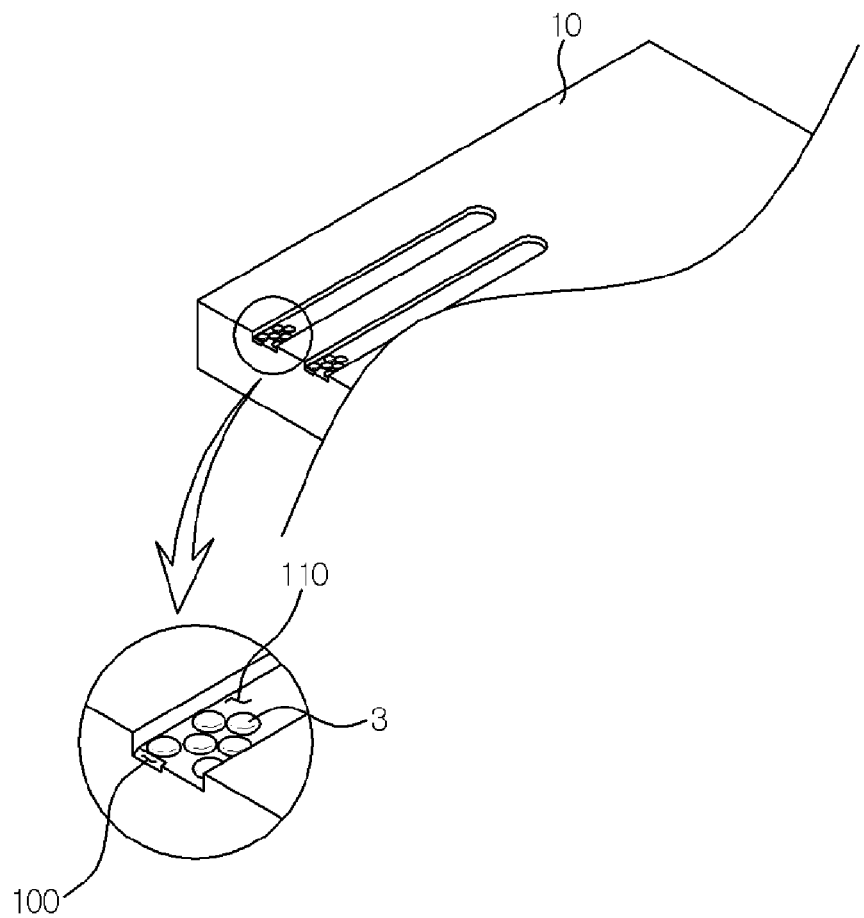
FIG. 4 is a perspective view schematically illustrating a transfer plate of a first example.
Figure 5:
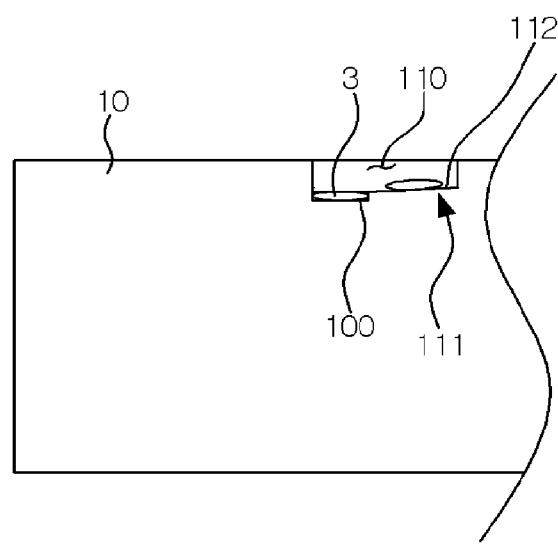
FIGS. 5 and 6 are side views of FIG. 4.
Figure 6:
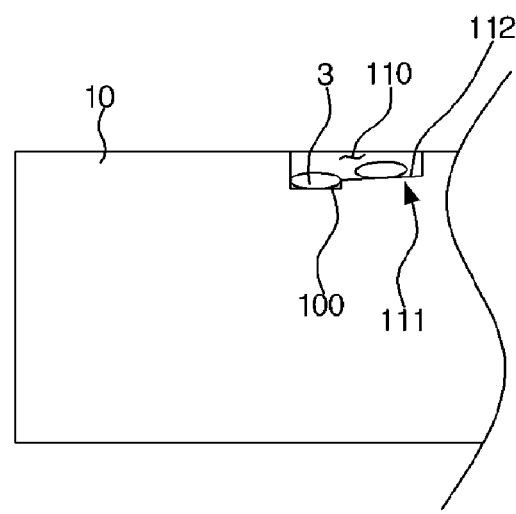

FIG. 4 is a perspective view schematically illustrating a transfer plate of a first example, and FIGS. 5 and 6 are side views of FIG. 4.

First, as illustrated in FIGS. 4 to 6, a plurality of seeds 3 are supplied to one side of the upper surface of the transfer plate 10.

Although the plurality of seeds 3 supplied to the one side of the upper surface of the transfer plate 10 include green onion seeds, onion seeds, Chinese cabbage seeds, broccoli seeds, cabbage seeds, lettuce seeds, head lettuce seeds, chili pepper seeds, water melon seeds, oriental melon seeds, cucumber seeds, sesame seeds, coating seeds, and the like, the present invention is not necessarily limited thereto. Further, it is apparent that the plurality of seeds 3 may further include various kinds of seeds.

A seed sorting groove 100 is formed on the upper side of one end of the transfer plate 10.

As the first example, one seed sorting groove 100 may be formed on the upper side of the one end of the transfer plate 10. However, in order to greatly improve work efficiency of a worker by shortening a time taken for individually sorting the plurality of seeds 3, it is preferable that a plurality of seed sorting grooves 100 of the transfer plate 10 are formed from the front side of the transfer plate 10 toward the rear side of the transfer plate 10 on the upper side of the one end of the transfer plate 10 at regular intervals, as illustrated in FIGS. 4 to 6.

As illustrated in FIG. 5, some of one kind of seeds 3 of the plurality of seeds 3 are inserted into the seed sorting groove 100.

Alternatively, as illustrated in FIG. 6, the entirety of one kind of seeds 3 of the plurality of seeds 3 are inserted into the seed sorting groove 100.

In order to supply one set of the plurality of seeds 3 from the front side of the transfer plate 10 toward the rear side of the transfer plate 10 on the upper side of the one end of the transfer plate 10 around the seed sorting groove 100 of the transfer plate 10 of the first example at regular intervals at a fixed amount, as illustrated in FIGS. 4 to 6, one or a plurality of seed accommodating grooves 110 in which the plurality of seeds 3 are accommodated at a fixed amount may be formed from the front side of the transfer plate 10 toward the rear side of the transfer plate 10 on the upper side of the one end of the transfer plate 10 at regular intervals.

The seed sorting groove 100 may be formed at one end of a bottom surface 111 of the seed accommodating groove 110.

Further, in order to individually and smoothly guide the plurality of seeds 3 accommodated in the seed accommodating groove 110 toward the seed sorting groove 100, as illustrated in FIGS. 5 and 6, an inclined surface 112 which is downward inclined as it goes from an inner peripheral surface of the seed accommodating groove 100 toward the seed sorting groove 100 may be formed on the bottom surface 111 of the sorting accommodating groove 110 between the inner peripheral surface of the seed accommodating groove 110 and the seed sorting groove 100.

Next, the vibration generating unit 20 generates vibrations on the transfer plate 10 under a control of a controller which will be described below, to spread the plurality of seeds 3 supplied to the one side of the upper surface of the transfer plate 10 such that the seeds 3 does not overlap each other, and at the same time, to move the plurality of seeds 3 toward the one end of the transfer plate 10.

In order to move the plurality of seeds 3 toward the one end of the transfer plate 10 while the seeds 3 are more easily spread, the upper surface of the transfer plate 10 may be downward inclined as it goes from the other end of the transfer plate 10 toward the one end of the transfer plate 10.

Alternatively, the transfer plate 10 itself is downward inclined as it goes from the other end of the transfer plate 10 toward the one end of the transfer plate 10 or an inclination angle of the transfer plate 10 may be adjusted in various schemes including a scheme in which the one end of the transfer plate 10 is vertically rotated by a cylinder, or the like.

The vibration generating unit 20 may be a vibrator or the like, and the vibration generating unit 20, which may be a vibrator or the like, may be provided at various positions, for example, at an upper portion of the transfer plate 10, at a lower portion of the transfer plate 10, or at a support 140 (see FIG. 2) supporting the transfer plate 10 at a certain height, which will be described below.

Next, the rotating drum 30 may be transversely arranged while being close to the one end of the transfer plate 10.

The driving motor (not illustrated) is shaft-coupled to a front portion of the rotating drum 30 or a rear portion of the rotating drum 30 to continuously or intermittently rotate the rotating drum 30 forward/rearward under a control of the controller.

Figure 7:
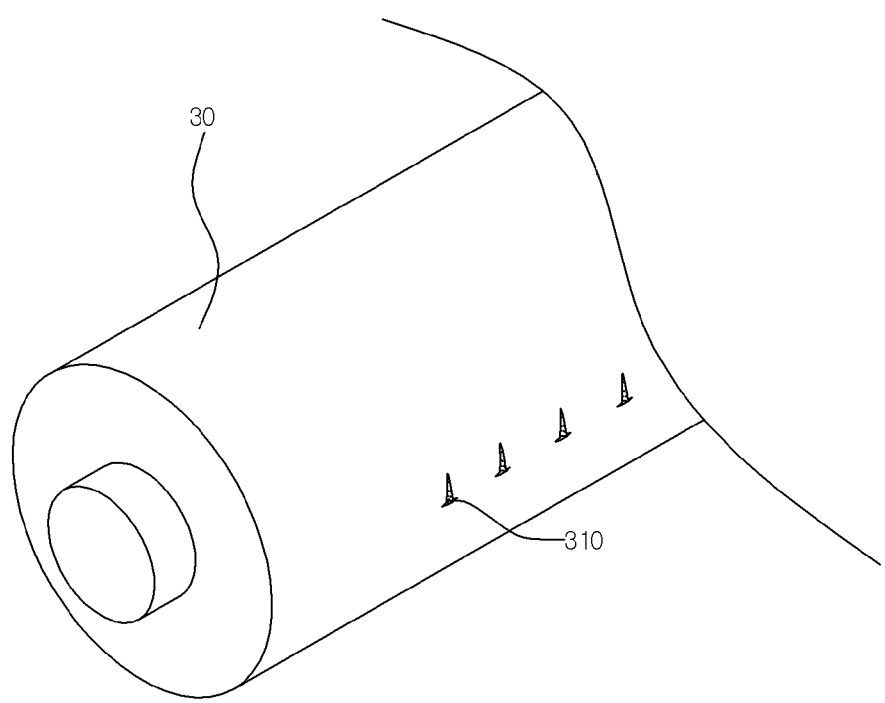
FIG. 7 is a perspective view schematically illustrating a rotating drum of the first example.

FIG. 7 is a perspective view schematically illustrating the rotating drum of the first example.

A seed inserting groove 310 is formed on an outer peripheral surface of the rotating drum 30.

As the first example, the one seed inserting groove 310 may be formed on the outer peripheral surface of the rotating drum 30. However, in order to greatly improve work efficiency of a worker by shortening a time taken for individually sorting the plurality of seeds 3, it is preferable that the plurality of seed inserting grooves 310 are formed on the outer peripheral surface of the rotating drum 30 from the front side of the rotating drum 30 toward the rear side of the rotating drum 30 at regular intervals, as illustrated in FIG. 7.

Figure 8:
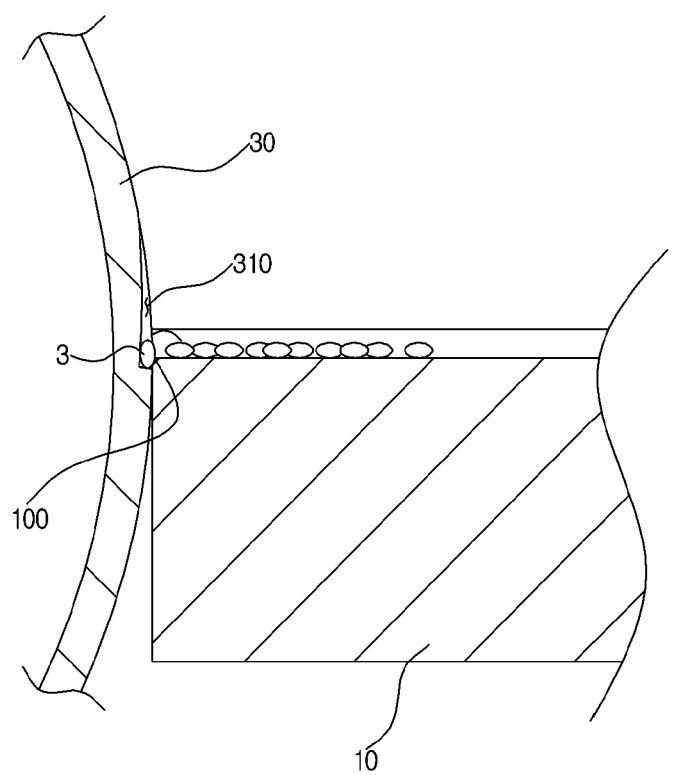
FIG. 8 is a sectional view taken along line A-A of FIG. 2.

FIG. 8 is a sectional view taken along line A-A of FIG. 2.

One seed 3, which is moved toward the seed sorting groove 100 of the transfer plate 10 by vibrations of the vibration generating unit 20 and is inserted into the seed sorting groove 100, is moved to the seed inserting groove 310 of the rotating drum 30, which communicates with the seed sorting groove 100 of the transfer plate 10, according to the forward/rearward rotation of the rotating drum 30 and is inserted into the seed inserting groove 310, as illustrated in FIG. 8.

In particular, as illustrated in FIG. 8, because the one seed 3 is slidingly moved to the seed sorting groove 100 of the transfer plate 10 and is inserted into the seed sorting groove 100 in a standing state, the one seed 3 inserted into the seed sorting groove 100 of the transfer plate 10 does not overlap another seed 3, and accordingly, the one seed 3 is more easily inserted into the seed inserting groove 310 of the rotating drum 30 in a standing state, so that individual sorting efficiency of the seeds 3 may be greatly improved.

Figure 19:
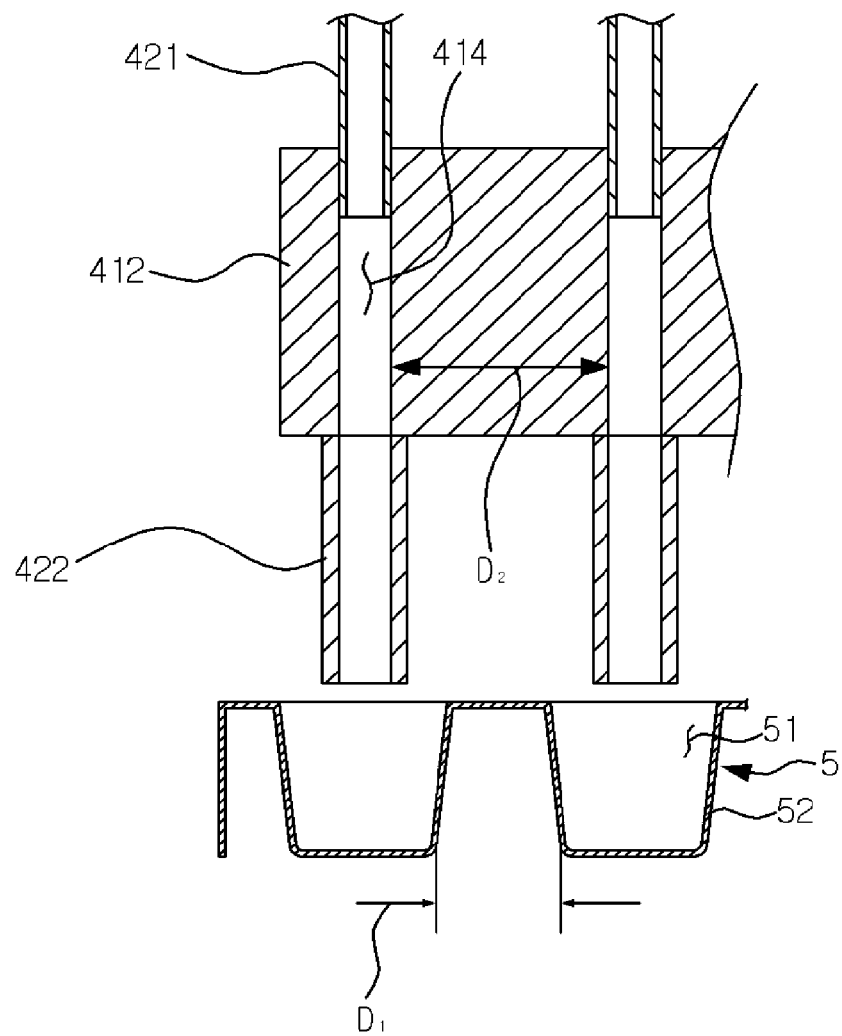

Next, the guide unit 40 is inserted into the seed inserting groove 310 of the rotating drum 30 according to the forward/rearward rotation of the rotating drum 30, and guides the one seed 3, which freely falls downward of the rotating drum 30, into a cell 51 (see FIG. 19) of a tray pot 5 (see FIG. 19).

Figure 9:
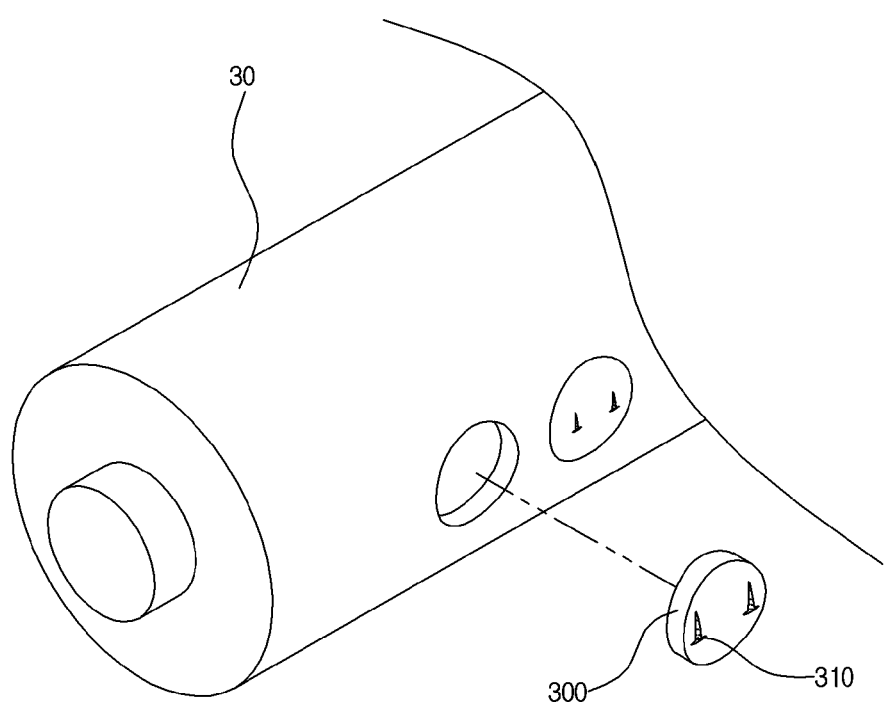
FIG. 9 is a perspective view schematically illustrating a rotating drum of a second example.
Figure 10:
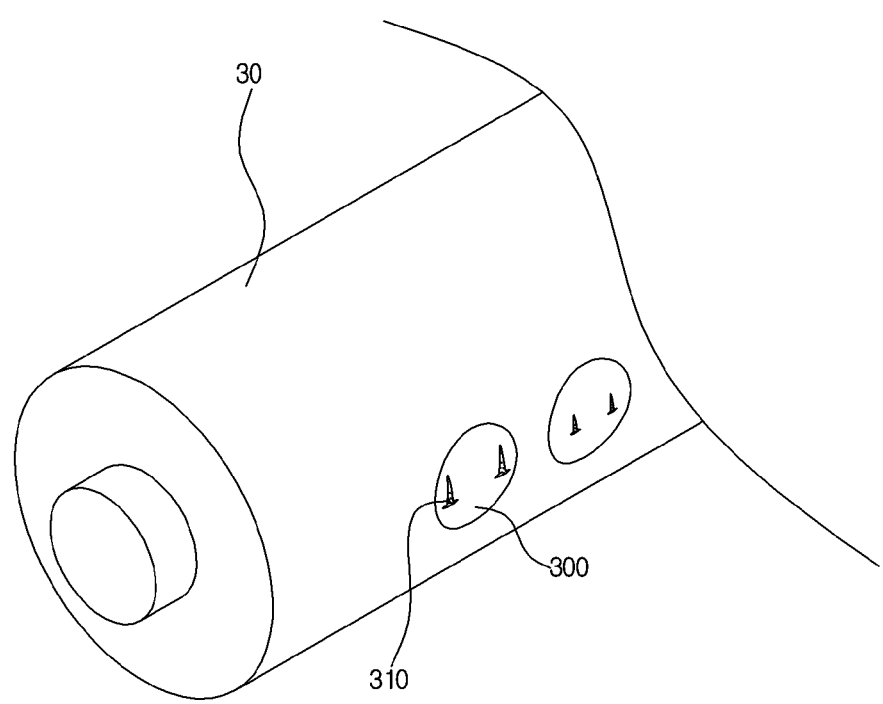
FIG. 10 is an exploded perspective view of FIG. 9.

FIG. 9 is a perspective view schematically illustrating a rotating drum of a second example, and FIG. 10 is an exploded perspective view of FIG. 9.

Next, as illustrated in FIGS. 9 and 10, as the second example, a plurality of plates 300 are detachably provided on an outer peripheral surface of the rotating drum 30, and the seed inserting grooves 310 may be formed on upper outer peripheral surfaces of the plurality of plates 300.

Insertion grooves 320 recessed inward of the rotating drum 30 at a certain depth may be formed on the outer peripheral surface of the rotating drum 30 from the front side of the rotating drum 30 toward the rear side of the rotating drum 30 at regular intervals, and the plurality of plates 300 may be forcibly fitted and fixed to the insertion grooves 320, respectively.

In order to prevent the plurality of plates 300 inserted into the insertion grooves 320 of the rotating drum 30 from being separated from the insertion grooves 320 during the forward/rearward rotation of the rotating drum 30, although not illustrated in the drawings, anti-separation pads which are in close contact with the plurality of plates 300 and are formed of rubber may be provided on the inner peripheral surfaces of the insertion grooves 320.

Further, the sizes of the plurality of seeds 3 differ from each other depending on the kinds of the plurality of seeds 3. Thus, in order to more easily individually sort the plurality of seeds 3 having different sizes, the area sizes occupied by the seed inserting grooves 310 of the plurality of plates 300 may differ from each other in accordance with the plates 300.

For example, the area size occupied by the seed inserting groove 310 formed on an outer peripheral surface of one of the plates 300 may be larger or smaller than the area size occupied by the seed inserting groove 310 formed on an outer peripheral surface of another one of the plates 300.

Figure 11:
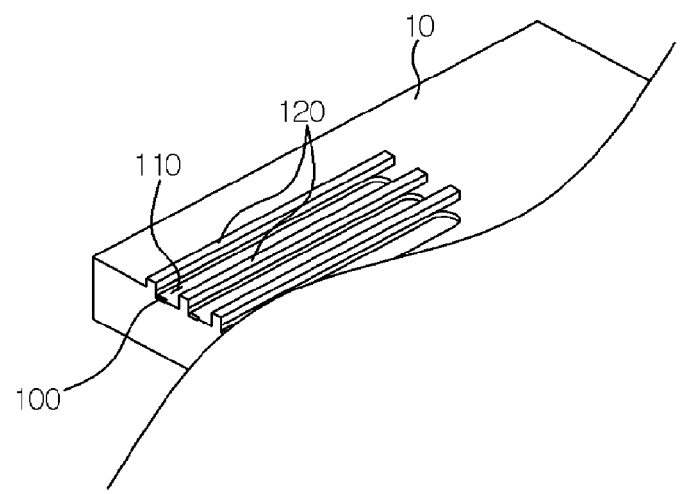
FIG. 11 is a perspective view schematically illustrating a transfer plate of the second example.
Figure 12:
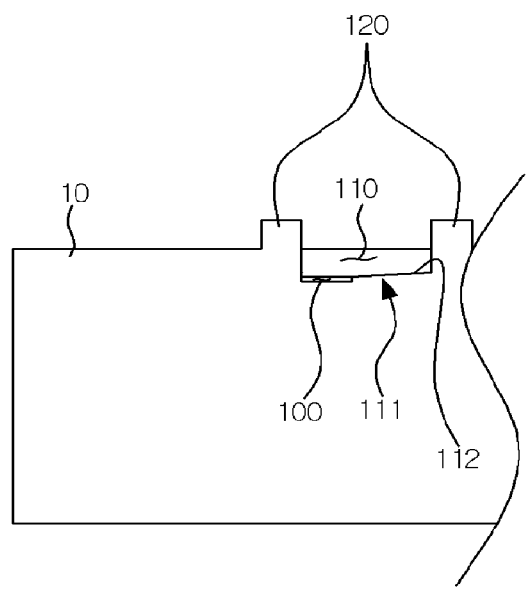
FIG. 12 is a side view of FIG. 11.

FIG. 11 is a perspective view schematically illustrating a transfer plate of the second example, and FIG. 12 is a side view of FIG. 11.

Next, as the second example, as illustrated in FIGS. 11 and 12, guide walls 120 extending from one side of the transfer plate 10 toward the other side of the transfer plate 10 in a front-rear direction by a predetermined length may be formed on the upper side of one end of the transfer plate 10 from the front side of the transfer plate 10 toward the rear side of the transfer plate 10 at regular intervals.

Further, the seed accommodating groove 110 may be formed on the upper side of the one end of the transfer plate 10 between the guide walls 120, and the seed sorting groove 100 may be formed at one end of the bottom surface 111 of the seed accommodating groove 110.

Further, the inclined surface 112 downward inclined as it goes from the inner peripheral surface of the seed accommodating groove 110 toward the seed sorting groove 100 may be formed on the bottom surface 111 of the seed accommodating groove 110 between the inner peripheral surface of the seed accommodating groove and the seed sorting groove 100.

Figure 13:
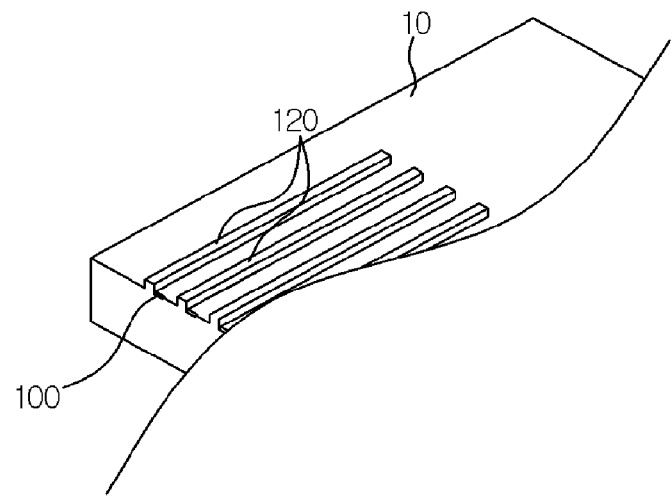
FIG. 13 is a perspective view schematically illustrating a transfer plate of a third example.
Figure 14:
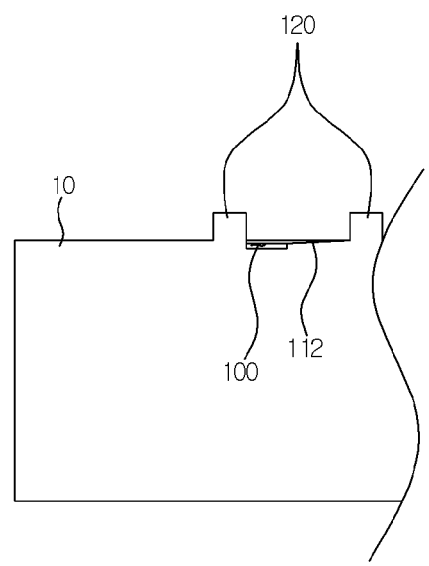
FIG. 14 is a side view of FIG. 13.

FIG. 13 is a perspective view schematically illustrating a transfer plate of a third example, and FIG. 14 is a side view of FIG. 13.

Next, as the third example, as illustrated in FIGS. 13 and 14, the guide walls 120 may be formed on the upper side of the one end of the transfer plate 10 at regular intervals, and the seed sorting groove 100 may be formed on the upper side of the one end of the transfer plate 10 between the guide walls 120.

Further, the inclined surface 112 downward inclined as it goes from the guide wall 120 toward the seed sorting groove 100 may be formed on the upper surface of the transfer plate 10 between the guide walls 120.

Figure 16:
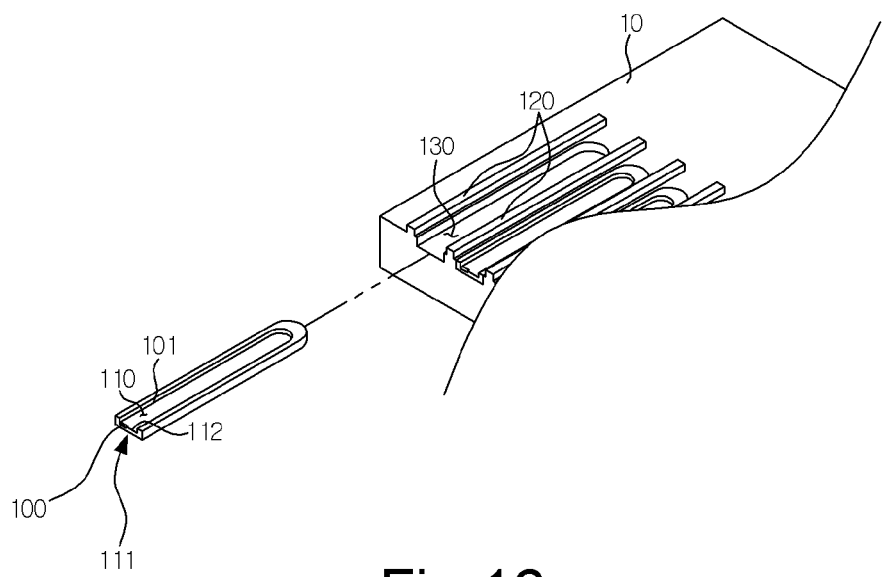
FIG. 16 is an exploded perspective view of FIG. 15.
Figure 15:
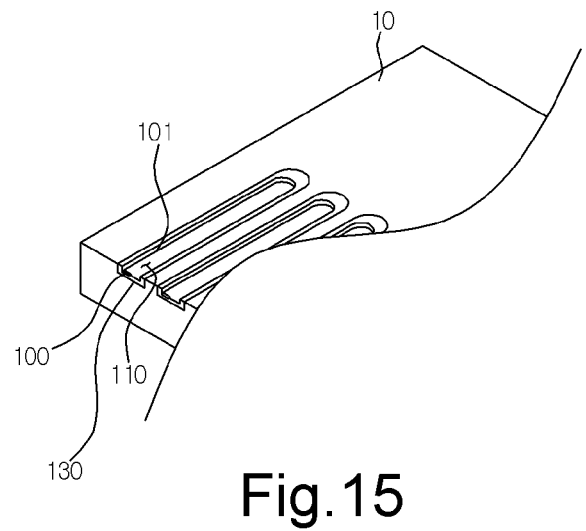
FIG. 15 is a perspective view schematically illustrating a transfer plate of a fourth example.

FIG. 15 is a perspective view schematically illustrating a transfer plate of a fourth example, and FIG. 16 is an exploded perspective view of FIG. 15.

Next, as the fourth example, as illustrated in FIGS. 15 and 16, a plurality of plates 101 may be detachably provided on the upper side of the one end of the transfer plate 10, and the seed sorting grooves 100 may be formed at ends of the plurality of plates 101.

Insertion grooves 130 recessed downward of the transfer plate 10 at a certain depth may be formed on the upper side of the one end of the transfer plate 10 from the front side of the transfer plate 10 toward the rear side of the transfer plate 10 at regular intervals, and the plurality of plates 191 may be detachably forcibly fitted and fixed in the insertion grooves 130, respectively.

In order to prevent the plurality of plates forcibly fitted and fixed in the insertion grooves 130 of the transfer plate 10 from being separated from the insertion grooves 130 of the transfer plate 10 too easily, although not illustrated in the drawings, anti-separation pads which are in close contact with the plurality of plates 101 and are formed of rubber may be provided on inner peripheral surfaces of the insertion grooves 130 of the transfer plate 10.

As the first example, the seed accommodating grooves 110 may be formed at upper portions of the plurality of plates 101 at a certain depth and the seed sorting grooves 100 may be formed at ends of the bottom surfaces 111 of the seed accommodating grooves 110.

Further, the sizes of the plurality of seeds 3 differ from each other depending on the kinds of the plurality of seeds 3. Thus, in order to more easily and individually sort the plurality of seeds 3 having different sizes, the area sizes occupied by the seed sorting grooves 100 of the plurality of plates 101 may differ from each other in accordance with the plates 101.

For example, the area size occupied by the seed sorting groove 100 formed at one end of the bottom surface 111 of the seed accommodating groove 110 of one plate 101 may be larger or smaller than the area size occupied by the seed sorting groove 100 formed at one end of the bottom surface 111 of the seed accommodating groove 110 of another plate 101.

The inclined surface 112 downward inclined as it goes toward the seed sorting groove 100 may be also formed on the bottom surface 111 between the inner peripheral surface of the seed accommodating groove 110 and the seed sorting groove 100 of each of the plurality of plates 101.

As the second example, as illustrated in FIG. 16, the guide walls 120 may be formed on the upper side of the one end of the transfer plate 10, and the insertion grooves 130 may be formed on the upper sides of the ends of the plurality of transfer plates 10 between the guide walls 120.

Further, as illustrated in FIG. 16, when the seed accommodating groove 110 is formed at an upper portion of each of the plurality of plates 101 of the second example, the seed sorting groove 100 may be formed at one end of the bottom surface 111 of the seed accommodating groove 110, and in addition, the inclined surface 112 may be further formed on the bottom surface 111 of the seed accommodating groove 110.

When the seed accommodating groove 110 is not formed at the upper portion of each of the plurality of plates 101 of the second example, the seed sorting groove 100 may be formed at the upper portion of the one end of each of the plurality of plates 101, and in addition, the inclined surface 112 may be further formed at an upper portion of each of the plates 101.

Figure 17:
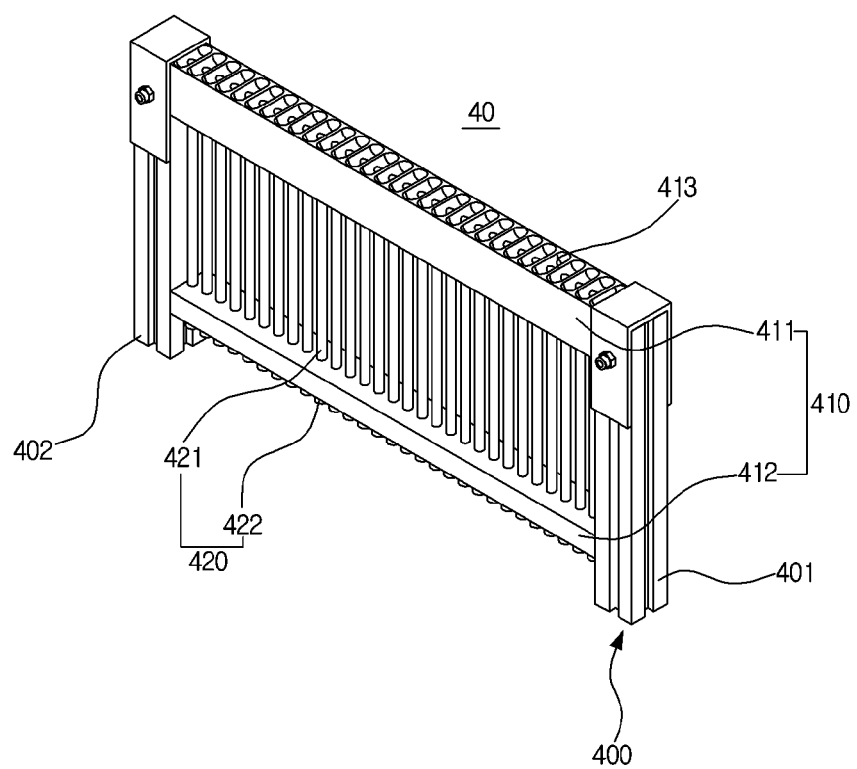
FIG. 17 is a perspective view schematically illustrating a guide unit.
Figure 18:
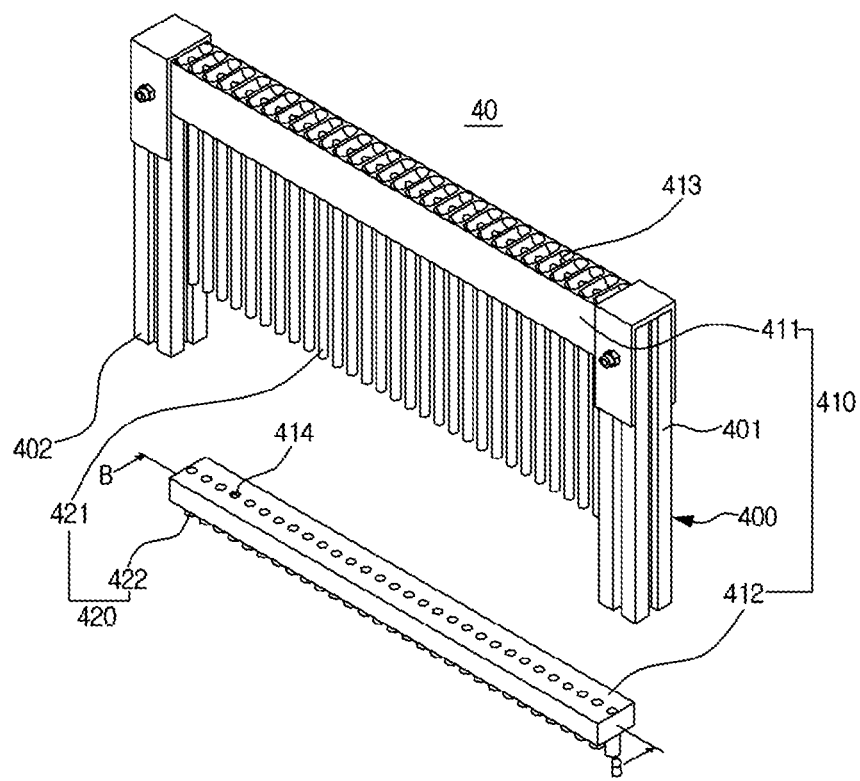
FIG. 18 is an exploded perspective view of FIG. 17, FIGS. 19 and 20 are partially enlarged sectional views taken along line B-B of FIG. 18.

FIG. 17 is a perspective view schematically illustrating a guide unit, and FIG. 18 is an exploded perspective view of FIG. 17.

Next, as illustrated in FIGS. 17 and 18, the guide unit 40 may roughly include a guide body 410 and a guide tube 420.

The guide body 410 may include an upper guide body 411 and a lower guide body 412.

The upper guide body 411 may be transversely provided on the lower side of one side of the rotating drum 30.

Support frames 400 for transversely supporting the upper guide body 411 at a certain height may be formed on the front side of the upper guide body 411 and the rear side of the upper guide body 411.

The support frames 400 may include a front support frame 401 and a rear support frame 402.

The front support frame 401 may vertically extend from the front side of the upper guide body 411 downward of the upper guide body 411.

The rear support frame 402 may vertically extend from the rear side of the upper guide body 411 downward of the upper guide body 411.

A plurality of guide plates 413 extending from one side of the upper guide body 411 toward the other side of the upper guide body 411 in a left-right direction by a certain length may be vertically formed from the front side of the upper guide body 411 toward the rear side of the upper guide body 411 inside the upper guide body 411 at regular intervals.

The lower guide body 412 may be transversely provided downward of the upper guide body 411 while maintaining a certain distance from the upper guide body 411.

A plurality of through holes 414 may be vertically formed from the front side of the lower guide body 412 toward the rear side of the lower guide body 412 inside the lower guide body 412 at regular intervals.

The guide tube 420 may include an upper guide tube 421 and a lower guide tube 422.

An upper portion of the upper guide tube 421 may be connected and fixed to a lower portion of the upper guide body 411 while being located between the guide plates 413 of the upper guide body 411 such that the upper guide tube 421 communicates with the upper guide body 411.

A lower portion of the upper guide tube 421 may be connected and fixed to an upper portion of a corresponding one of the plurality of through holes 414 of the lower guide body 412 such that the upper guide tube 421 communicates with the corresponding one of the plurality of through holes 414 of the lower guide body 412.

The lower guide tube 422 may be formed at a lower portion of a corresponding one of the plurality of through holes 414 of the lower guide body 412 such that the lower guide tube 422 communicates with the corresponding one of the plurality of through holes 414 of the lower guide body 412.

The lower guide tube 422 may guide, to the cell 51 of the tray pot 5, one seed 3 sequentially passing through the upper guide body 411, the upper guide tube 421, and the plurality of through holes 414 of the lower guide body by a self-weight.

Figure 20:
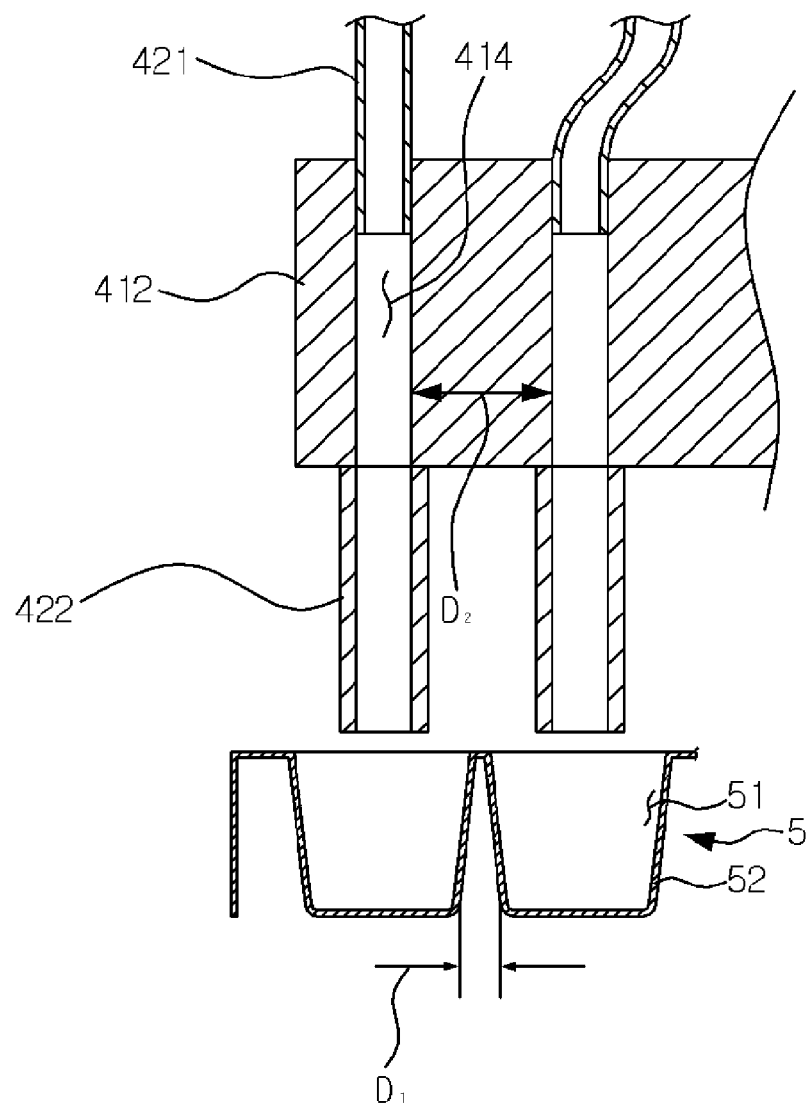

FIGS. 19 and 20 are partially enlarged sectional views taken along line B-B of FIG. 18.

Next, a plurality of pots 52 are arranged and formed in the tray pot 5 in a matrix form, and one seed 3 may freely fall to the cell 51 formed inside each of the plurality of pots 52.

In this way, a front-rear separation distance $D_1$ between the plurality of pots 52 arranged and formed in the tray pots 5 in a matrix form may differ from each other in accordance with the plurality of tray pots 5, as illustrated in FIGS. 19 and 20.

In order to more easily guide one seed 3 to the cells 51 formed inside the pots 52 of the plurality of tray pots 5 having different front-rear separation distances $D_1$, it is preferable that the lower guide body 412 is provided in the plurality, and one of the plurality of lower guide bodies 412 is detachably connected to the lower portion of the upper guide tube 421.

In particular, front-rear separation distances $D_2$ between the plurality of through holes 414 of the plurality of lower guide bodies 412 differ from each other such that a front-rear separation distance $D_2$ between the plurality of through holes 414 of one of the lower guide bodies 412 is larger or smaller than a front-rear separation distance $D_2$ between the plurality of through holes 414 of another one of the lower guide bodies 412.

Further, the upper guide tube 421 may be formed of a flexible material such that as the lower portion of the upper guide tube 421 is bent along the front-rear separation distance $D_2$ between the plurality of through holes 414, the lower portion of the upper guide tube 421 may be connected to an upper portion of a corresponding one of the plurality of through holes 414 in a detachably and forcibly fitted and fixed state while being more easily bent upward of the corresponding one of the plurality of through holes of one of the lower guide bodies 412.

Figure 21:
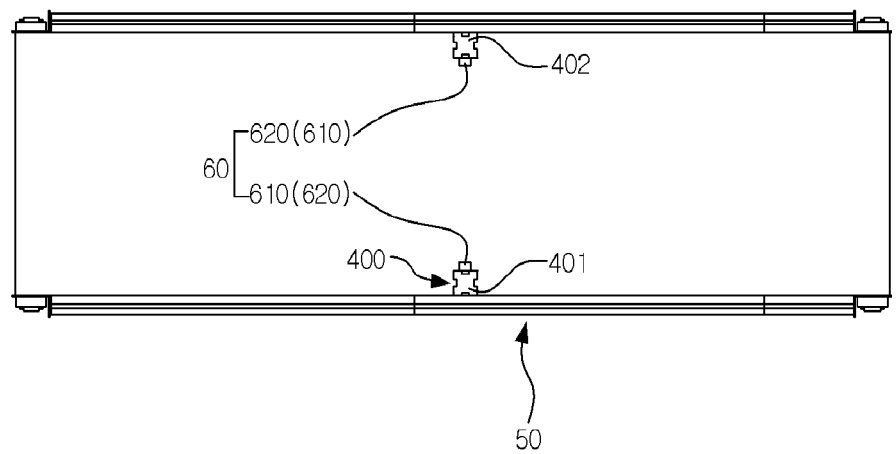
FIG. 21 is a plan view schematically illustrating a detection unit.
Figure 22:
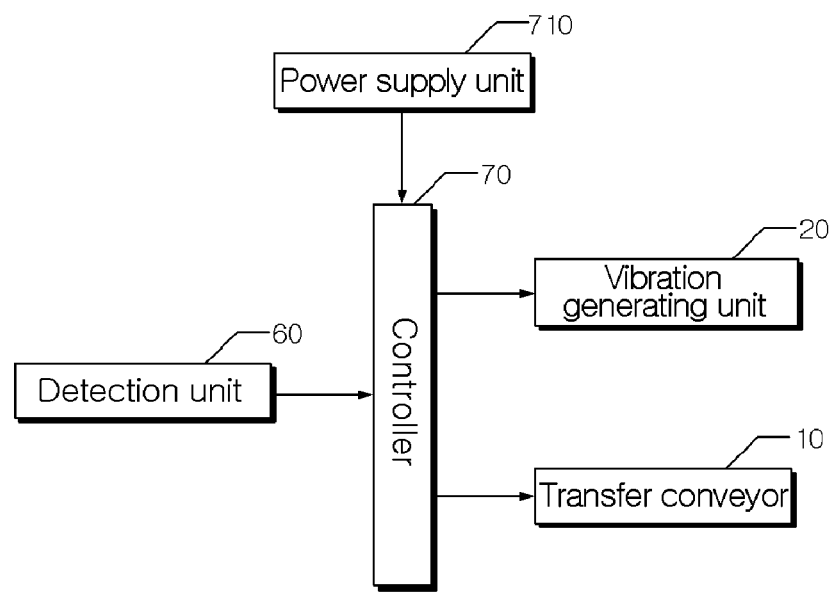
FIG. 22 is a block diagram schematically illustrating a control state of a controller.

FIG. 21 is a plan view schematically illustrating a detection unit, and FIG. 22 is a block diagram schematically illustrating a control state of a controller.

Next, as illustrated in FIGS. 1 to 3, a transfer conveyor 50 may be provided downward of the guide unit 40.

Support legs 501 transversely supporting the transfer conveyor 50 at a certain height may be vertically provided at edges of a lower portion of the transfer conveyor 50, respectively. Horizontality adjusting members 502 which may be horizontality adjusting screws for adjusting the horizontality of the transfer conveyor 50 may be screw-coupled to lower portions of the support legs 501, respectively.

The tray pot 5 may be seated on the upper surface of the transfer conveyor 50, and the transfer conveyor 50 may transfer the tray pot 5 from one side of the transfer conveyor 50 to the other side of the transfer conveyor 50.

In particular, in order to allow one seed 3 to more easily freely fall to the cell 51 formed inside the pot 52 of the tray pot 5, as illustrated in FIGS. 21 and 22, a detection unit 60 and a controller 70 may be further provided.

First, fixing frames 510 may be transversely provided at an upper portion of the transfer conveyor 50 in a left-right direction, and the fixing frames 510 may include a front fixing frame 511 and a rear fixing frame 512.

The front fixing frame 511 may be transversely fixed to the front side of the upper portion of the transfer conveyor 50 in a left-right direction in various scheme such as bolt fixing.

The rear fixing frame 512 may be transversely fixed to the rear side of the upper portion of the transfer conveyor 50 in the left-right direction in various schemes such as bolt fixing.

As illustrated in FIG. 1, a lower portion of the front support frame 401 and a lower portion of the rear support frame 502 of the support frames 400 may be fixed to the front fixing frame 511 and the rear fixing frame 512 in various schemes such as bolt fixing, respectively, such that the support frames 400 of the guide unit 40 are located between the front fixing frame 511 ad the rear fixing frame 512.

Further, support frames 330 vertically extending downward of the rotating drum 30 are formed on the front side of the rotating drum 30 and the rear side of the rotating drum 30 in order to transversely support the rotating drum 30 at a certain height, and a front portion of the rotating drum 30 and a rear portion of the rotating drum 30 may be shaft-coupled to upper portions of the support frames 330, respectively.

Lower portions of the support frames 330 transversely supporting the rotating drum 30 at a certain height may be fixed to the front fixing frame 511 and the rear fixing frame 512 of the fixing frames 510 in various schemes such as bolt fixing, respectively.

Further, supports 140 may be formed on the front side of the transfer plate 10 and the rear side of the transfer plate 10 to transversely support the transfer plate 10 at a certain height, respectively.

As illustrated in FIG. 2, each of the supports 140 may include a support plate 141 and a support member 142.

In a state in which the transfer plate 10 is seated on one side of an upper portion of the support plate 141, the transfer plate 10 may be provided on the one side of the upper portion of the support plate 141 in various schemes such as bolt fixing.

The support members 142 may be provided between the front side of the support plate 141 and the front side of the front fixing frame 511 and between the rear side of the support plate 141 and the rear side of the rear fixing frame 512, respectively.

Further, when the vibration generating units 20 are provided in the supports 140, one or two or more connecting rods 513 may be fixed at regular interval between the front fixing frame 511 and the rear fixing frame 512, as illustrated in FIGS. 1 to 2, such that uniform vibrations may be generated evenly in the entire transfer plate 10 while the transfer plate 10 is balanced in a left-right direction.

A front portion of the connecting rod 512 and a rear portion of the connecting rod 513 may be fixed to an upper portion of the front fixing frame 511 and an upper portion of the rear fixing frame 512 in various schemes such as bolt fixing, respectively.

Each of the support members 142 may include an upper plate 142a, a lower plate 142b, and an elastic member 142c.

The upper plate 142a and the lower plate 142b may be formed of rubber or metal.

The upper plate 142a may include a first upper plate $142a_1$ and a second upper plate $142a_2$.

The first upper plate $142a_1$ may be fixed to the front surface of the support plate 141 and the rear surface of the support plate 141 in various schemes such as integral connection and bolt fixing.

A guide slit $142a_{1i}$ extending from the front side of the first upper plate $142a_1$ toward the rear side of the first upper plate $142a_1$ by a predetermined length may be formed at the center of the first upper plate $142a_1$.

A first shaft member $142a_{12}$ accommodated in the guide slit $142a_{11}$ of the first upper plate $142a_1$ may be vertically formed at an upper central portion of the second upper plate $142a_2$.

Fixing member 142d which may be two fixing bolts or the like may be screw-coupled to an upper portion of the first shaft member $142a_{12}$, and the fixing members 142d which may be two fixing bolts or the like may be closely fixed to the upper surface of the first upper plate $142a_1$ and the lower surface of the first upper plate $142a_1$ around the first shaft member $142a_{12}$, respectively.

The lower plate 142b may include a first lower plate $142b_1$ and a second lower plate $142b_2$.

Lower portions of the first lower plates $142b_1$ may be fixed to an upper portion of the front fixing frame 511 and an upper portion of the rear fixing frame 512 in various schemes such as integral connection and bolt fixing, respectively.

Guide slits $142b_{11}$ extending from the front side of the first lower plate $142b_1$ toward the rear side of the first lower plate $142b_1$ by a predetermined length may be formed on one side of a lower portion of the first lower plate $142b_1$ and the other side of the lower portion of the first lower plate $142b_1$, respectively.

A second shaft member $142b_{12}$ accommodated in the guide slit $142b_{11}$ of the first lower plate $142b_1$ may be vertically formed at a lower central portion of the second lower plate $142b_2$.

The fixing members 142d which may be two fixing bolts or the like may be screw-coupled to a lower portion of the second shaft member $142a_{12}$, and the fixing members 142d may be closely fixed to the upper surface of the first lower plate $142b_1$ and the lower surface of the first lower plate $142b_1$ near the second shaft member $142b_{12}$, respectively.

The elastic member 142c may be a spring or the like. An upper portion of the elastic member 142c which may be a spring or the like may be integrally connected to a lower portion of the second upper plate $142a_2$, and a lower portion of the elastic member 142c may be integrally connected to an upper portion of the second lower plate $142b_2$.

The elastic member 142c may absorb vibrations generated in the transfer plate 10 such that excessive vibrations are not generated in the transfer plate 10.

The detection unit 60, which detects the pot 52 of the tray pot 5 that the transfer conveyor 50 transfers, may include, for example, a light emitting element 610 and a light receiving element 620.

As illustrated in FIG. 21, the light emitting element 610 and the light receiving element 620 may be provided at a lower portion of the front support frame 401 and a lower portion of the rear support frame 402 of the support frames 400 of the guide unit 40, respectively, such that the light emitting element 610 and the light receiving element 620 face each other.

Figure 23:
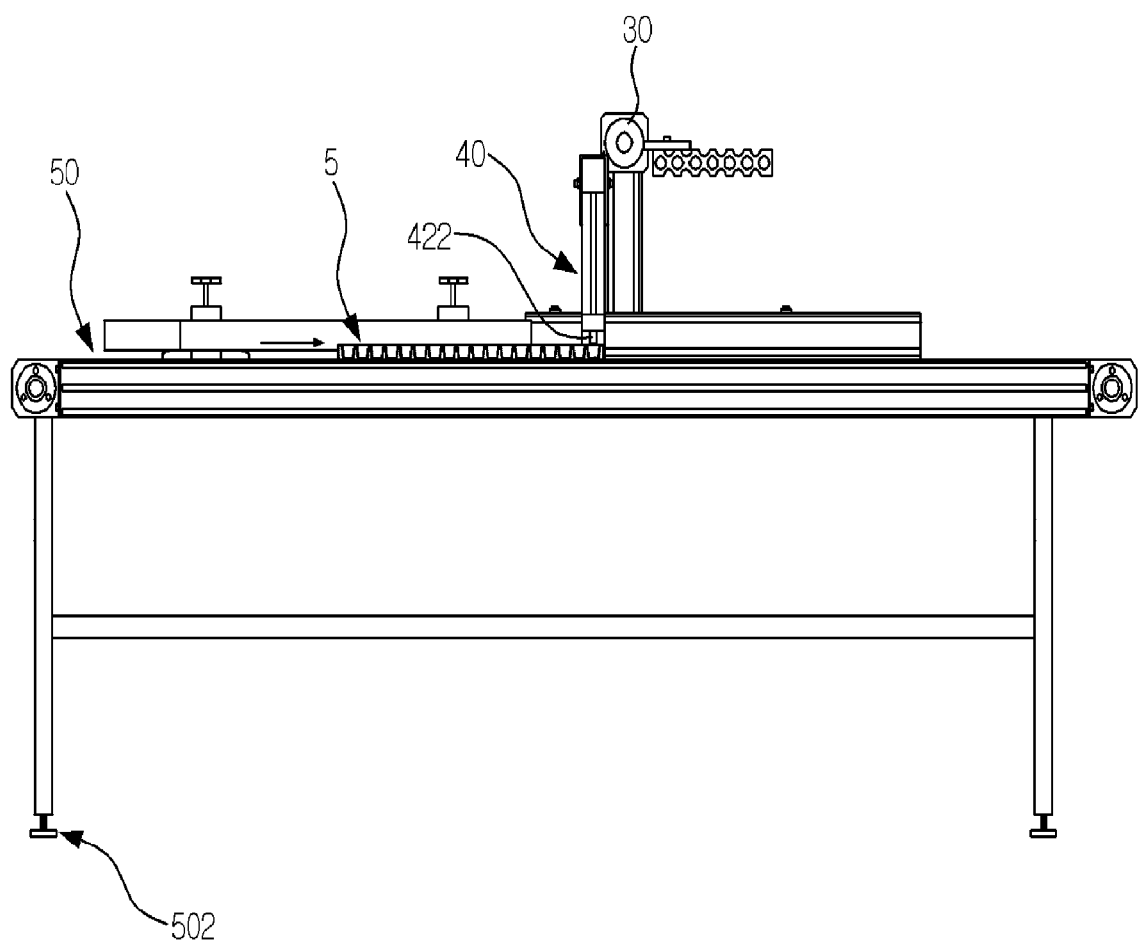
FIG. 23 is a front view schematically illustrating a process of transferring a tray pot by a transfer conveyor.
Figure 24:
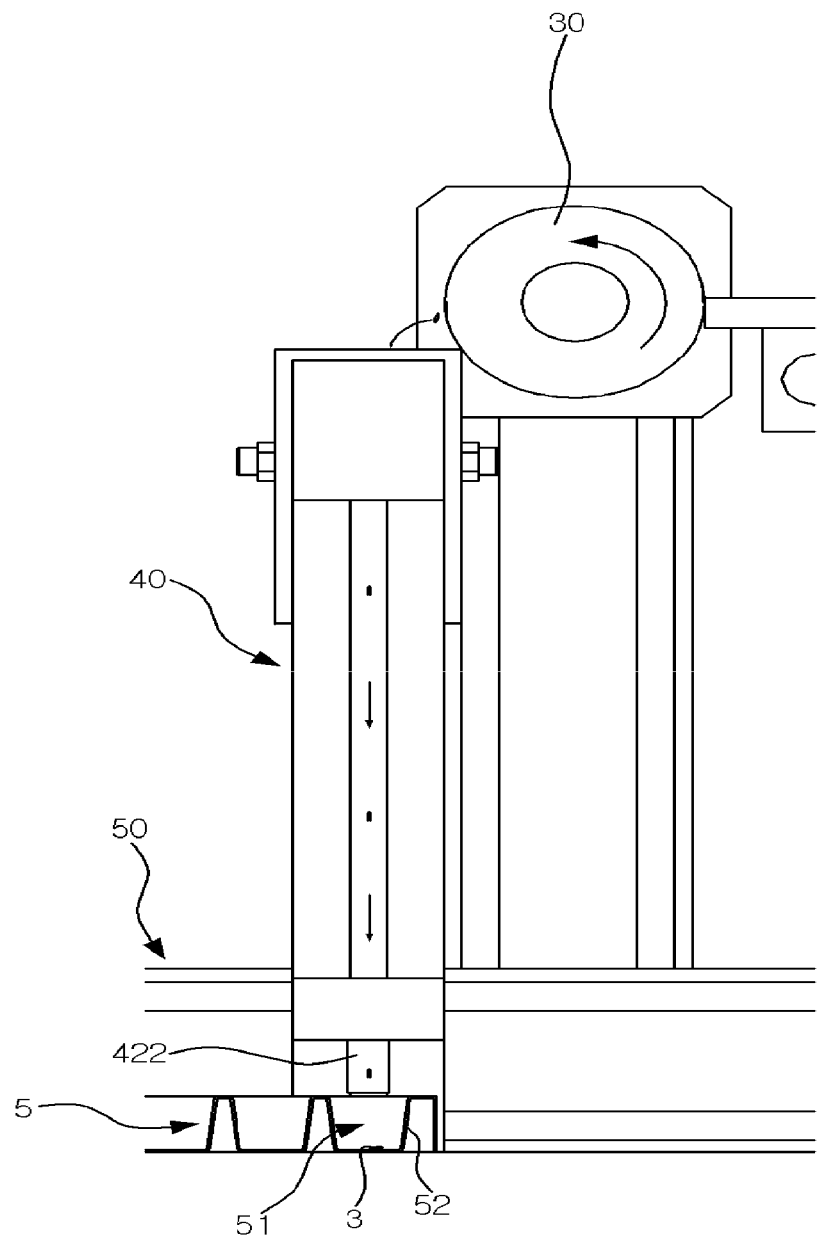
FIG. 24 is a partially enlarged front view enlargedly illustrating a state in which a seed is guided to a cell of the tray pot.

FIG. 23 is a front view schematically illustrating a process of transferring a tray pot by a transfer conveyor, and FIG. 24 is a partially enlarged front view enlargedly illustrating a state in which a seed is guided to a cell of the tray pot.

When the pot 52 of the tray pot 5 is located between the light emitting element 610 and the light receiving element 620, a light beam of the light emitting element 610 is covered by the pot 52, and thus, the light receiving element 620 fails to receive the light beam of the light emitting element 610.

At this time, the controller 70 may determine that the pot 52 of the tray pot 5 is located downward of the lower guide tube 422 of the guide unit 40, as illustrated in FIGS. 23 and 24, to perform a control to receive electric power from a power supply unit 710, stop an operation of the transfer conveyor 50 for a predetermined period of time, and then operate the transfer conveyor 50 in turn, so that the transfer conveyor 50 may intermittently transfer the tray pot 5.

When the pot 52 of the tray pot 5 is not located between the light emitting element 510 and the light receiving element 620, the light receiving element 620 receives the light beam from the light emitting element 610.

At this time, the controller 70 may determine that the pot 52 of the tray pot 5 is not located downward of the lower guide tube 422 of the guide unit 40, to control the transfer conveyor 50 such that the transfer conveyor 50 transfers the tray pot 5 toward the other side of the transfer conveyor 50.

When the tray pot 5 is not positioned exactly horizontally, there is a concern that the detection unit 60 including the light emitting element 610 and the light receiving element 620 may be malfunctioned. Thus, preferably, the detection unit 60 may be a diffusive-reflective optical sensor in which a light emitting unit and a light receiving unit are integrally provided such that the detection unit 60 may detect the pot 52 of the tray pot 5 without malfunction.

The diffusive-reflective optical sensor may constitute the detection unit 60 may be provided at a lower portion of the front support frame 401 or a lower portion of the rear support frame 402 of the guide unit 40.

According to the present invention, the seeds 3 supplied to the transfer plate 10 may be more easily spread so as not to overlap each other through vibrations generated, by the vibration generating unit 20, on the transfer plate 10 by which the seeds 3 are supplied. Accordingly, the seeds 3 moving toward one end of the transfer plate 10 may be individually sorted one by one through the rotating drum 30 formed on an outer peripheral surface of the seed inserting groove 310 into which the seeds 3 are inserted, so that individual sorting efficiency of the seeds 3 may be greatly improved. In addition, a structure is simple so that manufacturing costs may be greatly reduced. Furthermore, one seed of a plurality of seeds including fine seeds such as lettuce seeds may be sorted regardless of the sizes of the seeds, so that seed sorting efficiency may be greatly improved.

INDUSTRIAL APPLICABILITY

According to the present invention, the seeds supplied to the transfer plate may be more easily spread so as not to overlap each other through vibrations generated, by the vibration generating unit, on the transfer plate by which the seeds are supplied. Accordingly, the seeds moving toward one end of the transfer plate may be individually sorted one by one through the rotating drum formed on an outer peripheral surface of the seed inserting groove into which the seeds are inserted, so that individual sorting efficiency of the seeds may be greatly improved. In addition, a structure is simple so that manufacturing costs may be greatly reduced. Furthermore, one seed of a plurality of seeds including fine seeds such as lettuce seeds may be sorted regardless of the sizes of the seeds, so that seed sorting efficiency may be greatly improved.

The invention claimed is:

1. A seeder comprising:
a transfer plate having a seed sorting groove formed at one end thereof, a portion or the entirety of one kind of seeds being inserted into the seed sorting groove, and seeds being supplied onto an upper surface of the transfer plate;
a vibration generating unit configured to generate vibrations on the transfer plate, to spread the supplied seeds such that the seeds do not overlap each other, and at the same time, to move the seeds toward one end thereof;
a rotating drum arranged to be adjacent to one end of the transfer plate to be rotated, and having a seed inserting groove formed on an outer peripheral surface thereof, the seeds inserted into the seed sorting groove of the transfer plate being moved and inserted into the seed inserting groove according to rotation;
a guide unit configured to guide, to a cell of a tray pot, the seeds which are inserted into the seed inserting groove of the rotating drum according to the rotation of the rotating drum and freely fall; and
wherein a seed accommodating groove is formed at one end of the transfer plate, and the seed sorting groove is formed at one end of a bottom surface of the seed accommodating groove.

2. The seeder of claim 1, wherein the seed sorting groove of the transfer plate is provided in plurality and the plurality of seed sorting grooves are formed at one end of the transfer plate at regular intervals.

3. The seeder of claim 1, wherein the seed inserting groove of the rotating drum is provided in plurality and the plurality of seed inserting grooves are formed on an outer peripheral surface of the rotating drum at regular intervals.

4. The seeder of claim 1, wherein the seeds are inserted into the seed sorting groove of the transfer plate in a standing state.

5. The seeder of claim 1, wherein guide walls are formed at one end of the transfer plate at regular intervals, a seed accommodating groove is formed at one end of the transfer plate between the guide walls, and the seed sorting groove is formed at one end of a bottom surface of the seed accommodating groove.

6. The seeder of claim 1, wherein an inclined surface downward inclined as the inclined surface goes from an inner peripheral surface of the seed accommodating groove toward the seed sorting groove is formed on the bottom surface of the seed accommodating groove between an inner peripheral surface of the seed accommodating groove and the seed sorting groove.

7. The seeder of claim 1, wherein guide walls are formed at one end of the transfer plate at regular intervals and the seed sorting groove is formed at one end of the transfer plate between the guide walls.

8. The seeder of claim 7, wherein an inclined surface downward inclined as the inclined surface goes from the guide walls toward the seed sorting groove is formed on an upper surface of the transfer plate between the guide walls.

9. The seeder of claim 1, wherein a guide unit comprises:
a guide body comprising an upper guide body provided below one side of the rotating drum and having a plurality of guide plates vertically formed therein at regular intervals, and a lower guide body provided below the upper guide body and having a plurality of through holes formed therein at regular intervals; and
a guide tube comprising an upper guide tube located between the guide plates of the upper guide body, an upper portion of the upper guide tube being connected to a lower portion of the upper guide body such that the upper guide tube communicates with the upper guide body, and a lower portion of the upper guide tube being connected to an upper portion of a corresponding one of the plurality of through holes of the lower guide body such that the upper guide tube communicates with the corresponding one of the plurality of through holes of the lower guide body, and comprising a lower guide tube formed at a lower portion of the corresponding one of the plurality of through holes of the lower guide body such that the lower guide tube communicates with the corresponding one of the plurality of through holes of the lower guide body, and configured to guide, to the cell of the tray pot, the seeds sequentially passing through the upper guide body, the upper guide tube, and the plurality of through holes of the lower guide body.

10. The seeder of claim 9, wherein the lower guide body is provided in plurality,
wherein separation distances between the plurality of through holes differ from each other in accordance with the plurality of lower guide bodies, and
wherein any one of the plurality of lower guide bodies is detachably connected to a lower portion of the upper guide tube formed of a flexible material.

11. The seeder of claim 1, wherein a transfer conveyor configured to transfer the tray pot seated on an upper surface of the transfer conveyor from one side to the other side of the transfer conveyor is provided below the guide unit.

12. The seeder of claim 11, wherein a detection unit configured to detect a pot of the tray pot that the transfer conveyor transfers; and a controller configured to control the transfer conveyor such that the transfer conveyor continuously or intermittently transfers the tray pot based on a detection signal of the detection unit are provided.

13. The seeder of claim 1, wherein a plurality of plates are detachably provided at one end of the transfer plate,
   wherein the seed sorting groove is formed at one end of each of the plurality of plates, and
   wherein the sizes of the seed sorting grooves differ from each other in accordance with the plurality of plates.

14. The seeder of claim 1, wherein a plurality of plates are detachably provided on an outer peripheral surface of the rotating drum,
   wherein the seed inserting groove is formed on an outer peripheral surface of each of the plurality of plates, and
   wherein the sizes of the seed inserting grooves differ from each other in accordance with the plurality of plates.

* * * * *